(12) United States Patent
Deguchi

(10) Patent No.: US 10,384,275 B2
(45) Date of Patent: Aug. 20, 2019

(54) CUTTING TOOL AND METHOD FOR MANUFACTURING THE MACHINED PRODUCT

(71) Applicant: KYOCERA Corporation, Kyoto-shi, Kyoto (JP)

(72) Inventor: Shin Deguchi, Moriyama (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/567,486

(22) PCT Filed: Apr. 20, 2016

(86) PCT No.: PCT/JP2016/062517
§ 371 (c)(1),
(2) Date: Oct. 18, 2017

(87) PCT Pub. No.: WO2016/171174
PCT Pub. Date: Oct. 27, 2016

(65) Prior Publication Data
US 2018/0111206 A1 Apr. 26, 2018

(30) Foreign Application Priority Data
Apr. 21, 2015 (JP) .................. 2015-086547

(51) Int. Cl.
*B23B 27/00* (2006.01)
*B23C 5/06* (2006.01)
*B23C 5/24* (2006.01)

(52) U.S. Cl.
CPC ............. *B23C 5/06* (2013.01); *B23C 5/241* (2013.01); *B23C 5/2472* (2013.01); *B23C 2210/168* (2013.01); *B23C 2210/205* (2013.01)

(58) Field of Classification Search
CPC ... B23C 5/2226; B23C 5/2252; B23C 5/2278; B23C 5/241
See application file for complete search history.

(56) References Cited

U.S. PATENT DOCUMENTS 3,391,438 A * 7/1968 Milewski .............. B23C 5/2278
407/38
4,278,373 A * 7/1981 Wolfe, III ........... B23B 27/1614
407/114

(Continued)

FOREIGN PATENT DOCUMENTS

JP S50-78981 A 6/1975
JP H09-76111 A 3/1997

(Continued)

OTHER PUBLICATIONS

International Search Report (Form PCT/ISA/210) dated Jun. 14, 2016, issued in PCT/JP2016/062517.

(Continued)

*Primary Examiner* — Willmon Fridie, Jr.
(74) *Attorney, Agent, or Firm* — Viering, Jentschura & Partner MBB

(57) ABSTRACT

In an embodiment, a cutting tool includes a holder that is a columnar body and includes a pocket in which an insert disposed. The pocket includes a first surface in contact with the insert, a second surface, and a projecting portion. The second surface is disposed further forward in a rotational direction of a rotational axis than the first surface, and disposed on a radial inner side of the holder. The projecting portion is disposed closer to a radial outer circumferential side of the holder than the first surface and projects forward in the rotational direction of the rotational axis. The second surface is inclined and comes closer to an outer circumfer- (Continued)

ence of the holder as going forward in the rotational direction of the rotational axis, in a front view of a first end.

18 Claims, 21 Drawing Sheets

(56) References Cited

U.S. PATENT DOCUMENTS

| | | | | |
|---|---|---|---|---|
| 4,616,965 | A * | 10/1986 | Anderson | B23B 51/0466 407/101 |
| 5,052,864 | A * | 10/1991 | Shaw | B23B 51/107 408/201 |
| 5,647,701 | A * | 7/1997 | Tempel | B23C 5/207 407/103 |
| 6,231,274 | B1 * | 5/2001 | Yoneyama | B23C 5/006 407/113 |
| 2009/0290944 | A1 * | 11/2009 | Gamble | B23C 5/08 407/76 |
| 2011/0150582 | A1 * | 6/2011 | Sjoo | B23C 5/06 407/40 |
| 2012/0230790 | A1 * | 9/2012 | Uno | B23C 5/109 408/227 |
| 2013/0129435 | A1 * | 5/2013 | Ortlund | B23B 27/16 407/70 |
| 2014/0003872 | A1 * | 1/2014 | Kovac | B23C 5/22 407/11 |
| 2014/0161544 | A1 | 6/2014 | Morandeau, Sr. et al. | |
| 2016/0089730 | A1 * | 3/2016 | Kocherovsky | B23C 5/2472 407/88 |
| 2017/0036279 | A1 * | 2/2017 | Yamamoto | B23C 5/06 |
| 2018/0009045 | A1 * | 1/2018 | Yamamoto | B23C 5/06 |
| 2018/0185933 | A1 * | 7/2018 | Deguchi | B23C 5/06 |

FOREIGN PATENT DOCUMENTS

| | | |
|---|---|---|
| JP | 2014-113686 A | 6/2014 |
| WO | 2010/101503 A1 | 9/2010 |

OTHER PUBLICATIONS

Written Opinion (Form PCT/ISA/237) dated Jun. 14, 2016, issued in PCT/JP2016/062517.

* cited by examiner

US 10,384,275 B2

CUTTING TOOL AND METHOD FOR MANUFACTURING THE MACHINED PRODUCT

TECHNICAL FIELD

The present embodiment relates to a cutting tool and to a method for manufacturing a machined product.

BACKGROUND ART

Cutting tools such as the milling tool described in JP 09-76111 A (Patent Document 1) have been known as cutting tools used for milling work materials such as metals. The milling tool described in Patent Document 1 is provided with a tool main body (holder) that includes a tip mounting groove (pocket), and a cutting edge tip (insert) inserted in the tip mounting groove. The cutting edge tip is pressed from a vertical direction by a wedge member and a holder fixed to the tool main body, and is thus fixed to the tool main body.

A projecting portion capable of engaging with the cutting edge tip is provided to a front end of a seating face of the cutting edge tip, in a direction opposite to a direction of a centrifugal force acting on the cutting edge tip. As a result, the cutting edge tip is locked by the projecting portion even when a large centrifugal force is applied to the cutting edge tip, thereby preventing the cutting edge tip from popping out. Further, while a force rotating forward in the rotational direction of the tool main body with the projecting portion serving as the center is applied by the centrifugal force described above onto the cutting edge tip locked by the projecting portion, an upper surface of the cutting edge tip is pressed by the wedge member, keeping the cutting edge tip from rotating.

In the milling tool described in Patent Document 1, although the upper surface of the cutting edge tip is a region where chips flow, the upper surface of the cutting edge tip is pressed and the region where the chips flow is narrowed by the wedge member, resulting in the possibility of a decrease in chip dischargeability to the outside. Further, when the region of the upper surface of the insert pressed by the wedge member is narrowed to increase chip dischargeability, a binding force of the insert resulting from the wedge member decreases.

The present embodiment is made in view of the above-mentioned problems, and provides a cutting tool capable of fixing an insert to a holder while discharging chips in a favorable manner.

SUMMARY OF INVENTION

In an embodiment, a cutting tool includes a holder and an insert. The holder is a columnar body extending along a rotational axis from a first end to a second end. The holder includes a pocket on a first end side thereof. The insert is disposed in the pocket, and includes a cutting edge on at least a part of a ridge line of neighboring surfaces. The pocket includes a first surface in contact with the insert, a second surface, and a projecting portion. The second surface is disposed further forward in a rotational direction of the rotational axis than the first surface, and is disposed on a radial inner side of the holder. The projecting portion is disposed closer to a radial outer circumferential side of the holder than the first surface. The projection portion projects forward in the rotational direction of the rotational axis. The second surface is inclined and comes closer to an outer circumference of the holder as going forward in the rotational direction of the rotational axis, in a front view of a first end.

DESCRIPTION OF EMBODIMENTS

Figure 1:
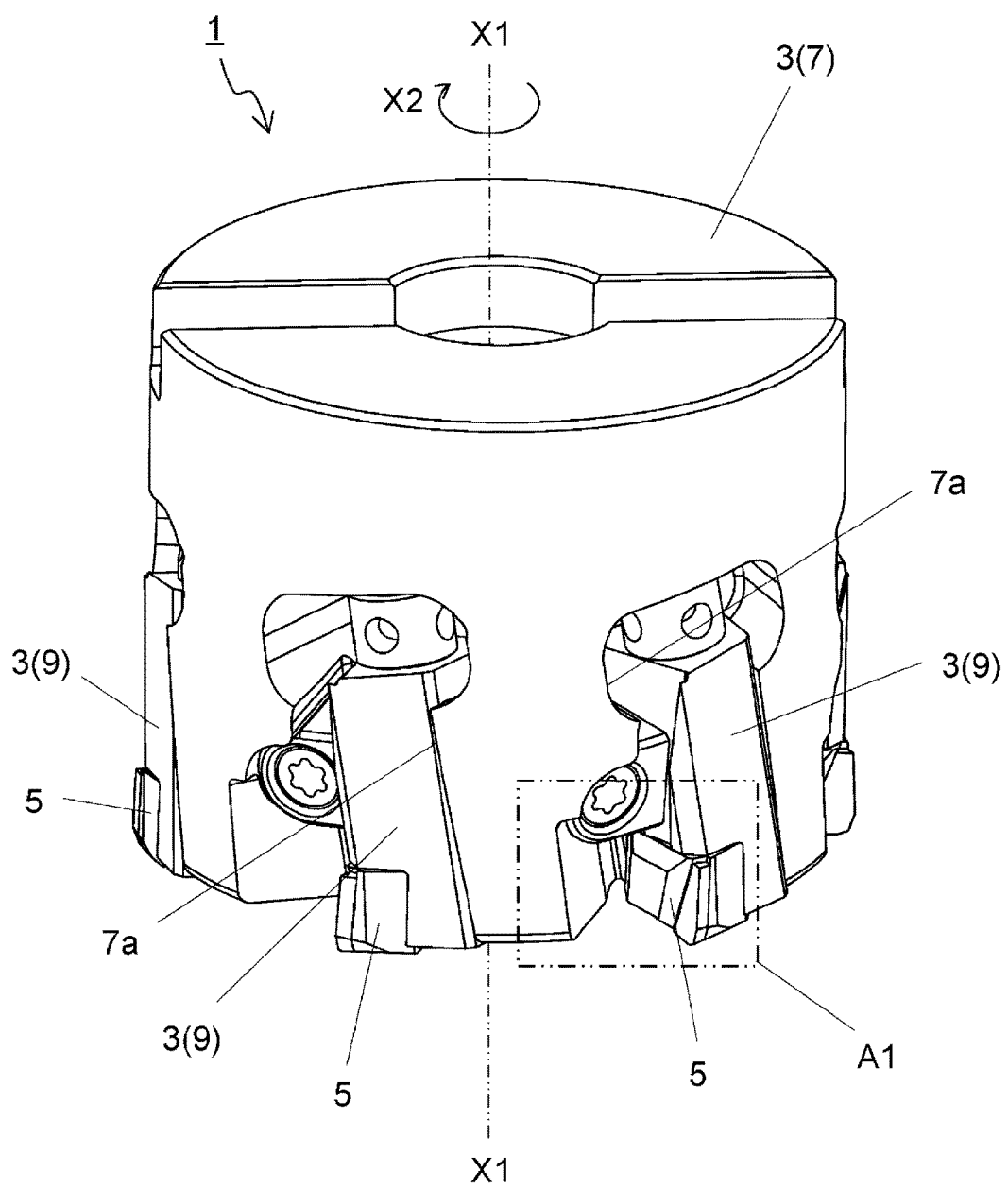
FIG. 1 is a perspective view illustrating a cutting tool of an embodiment.
Figure 2:
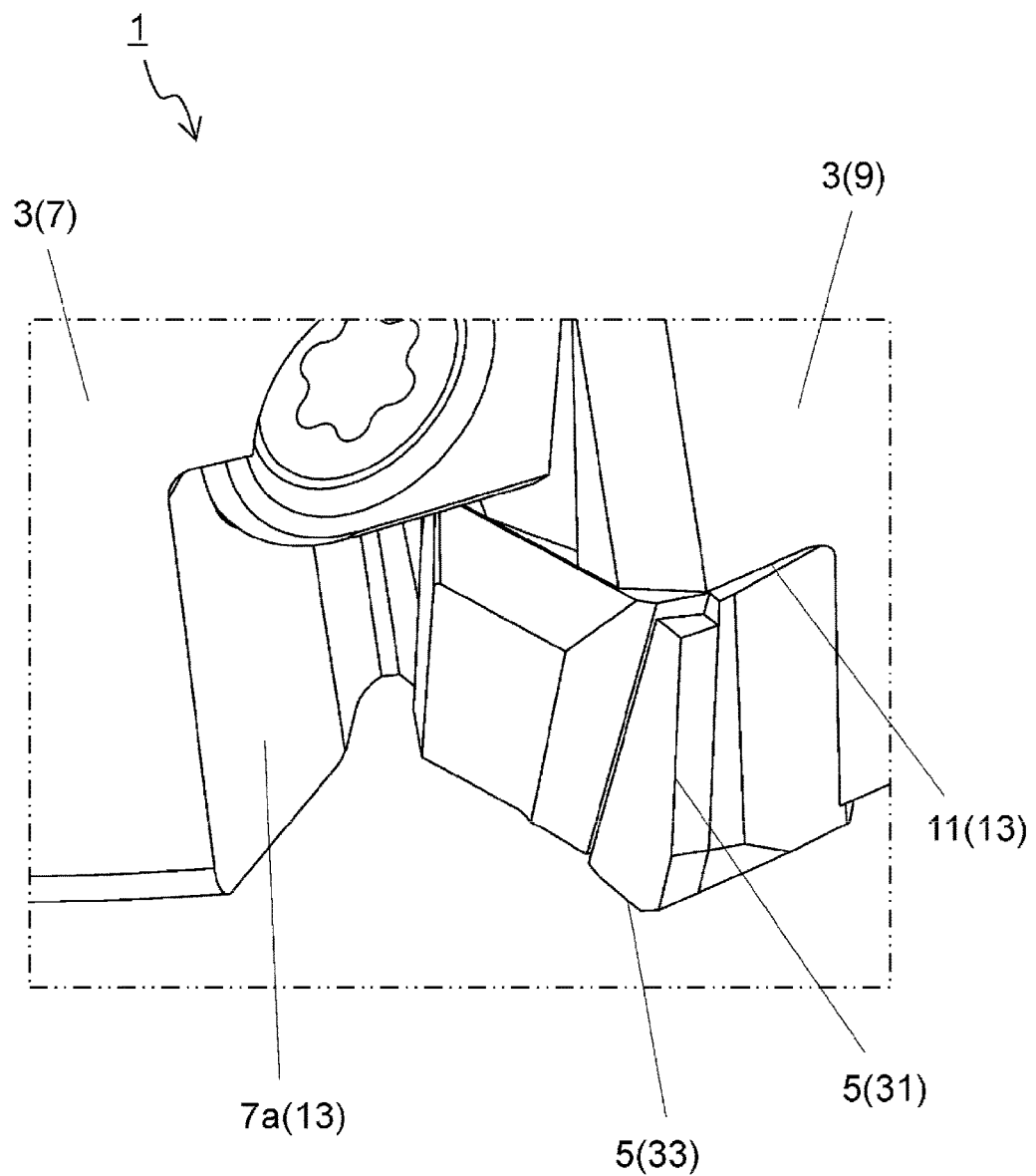
FIG. 2 is an enlarged view of a region A1 illustrated in FIG. 1.

The following describes in detail a cutting tool of one embodiment using the drawings. However, for convenience of explanation, each of the drawings referenced below is simplified to illustrate only the main members of the constituent members of the embodiment. Accordingly, the cutting tool of the present invention may be provided with any constituent member which is not illustrated in each of the referenced drawings. Further, the dimensions of the members in the drawings do not faithfully represent the actual dimensions of the constituent members, the dimension ratios of the members, or the like.

A cutting tool 1 of the present embodiment, as illustrated in FIG. 1, is provided with a holder 3 and a plurality of inserts 5. Note that, while a plurality of the inserts 5 are provided to the cutting tool 1 of the present embodiment, a configuration in which only one insert 5 is provided is unproblematic.

The holder 3 is a columnar body that includes a rotational axis X1 and extends from a first end to a second end along this rotational axis X1. Specifically, the holder 3 of the present embodiment is, in general, a circular columnar body. The holder 3 rotates about the rotational axis X1 in a rotational direction X2 with the rotational axis X1 serving as the center during the machining of a work material for manufacturing a machined product. In the present embodiment, the central axis of the holder 3, which is a circular columnar body, and the rotational axis X1 of the holder 3 coincide.

Figure 3:
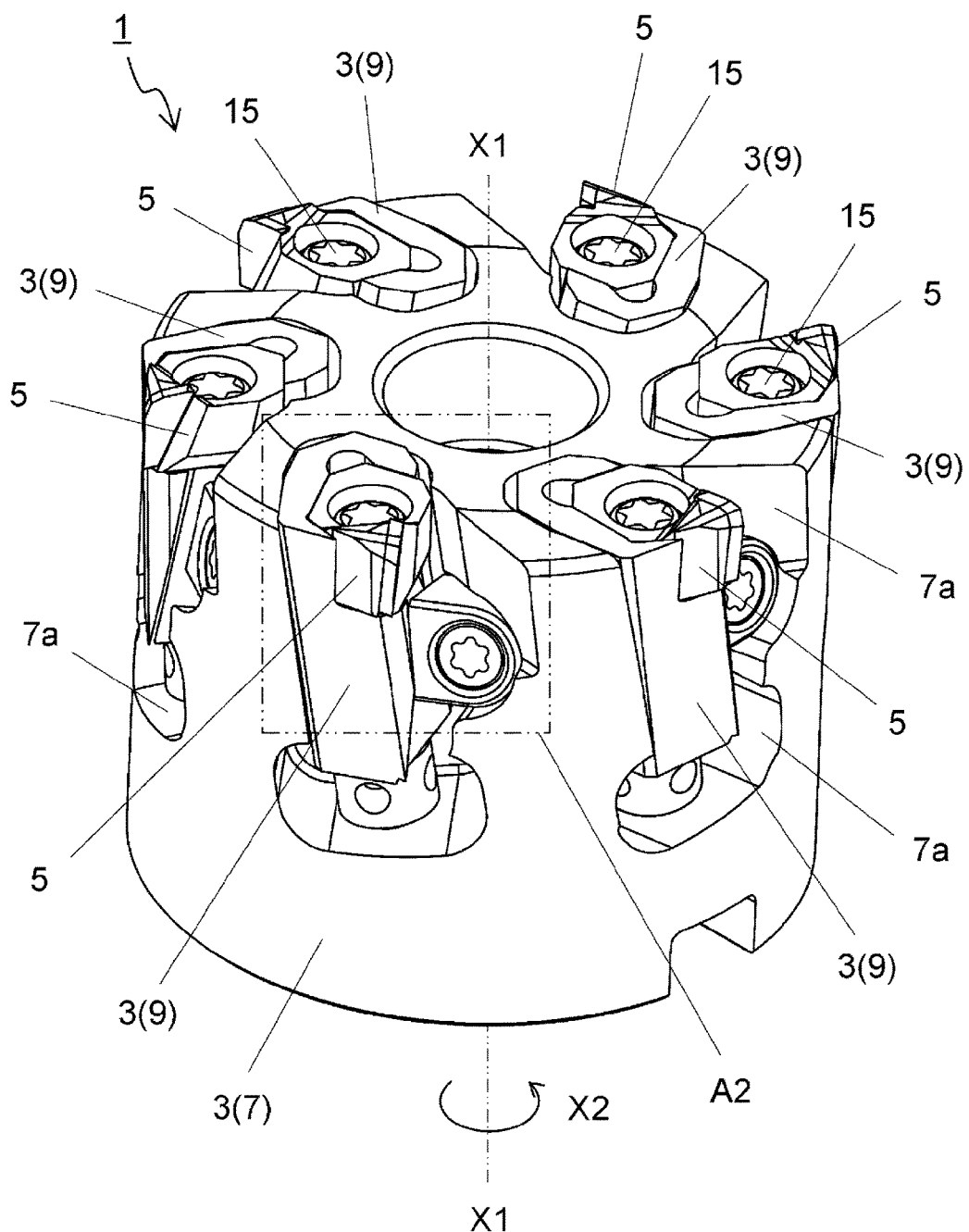
FIG. 3 is a perspective view of the cutting tool illustrated in FIG. 1 as viewed from a different direction.
Figure 4:
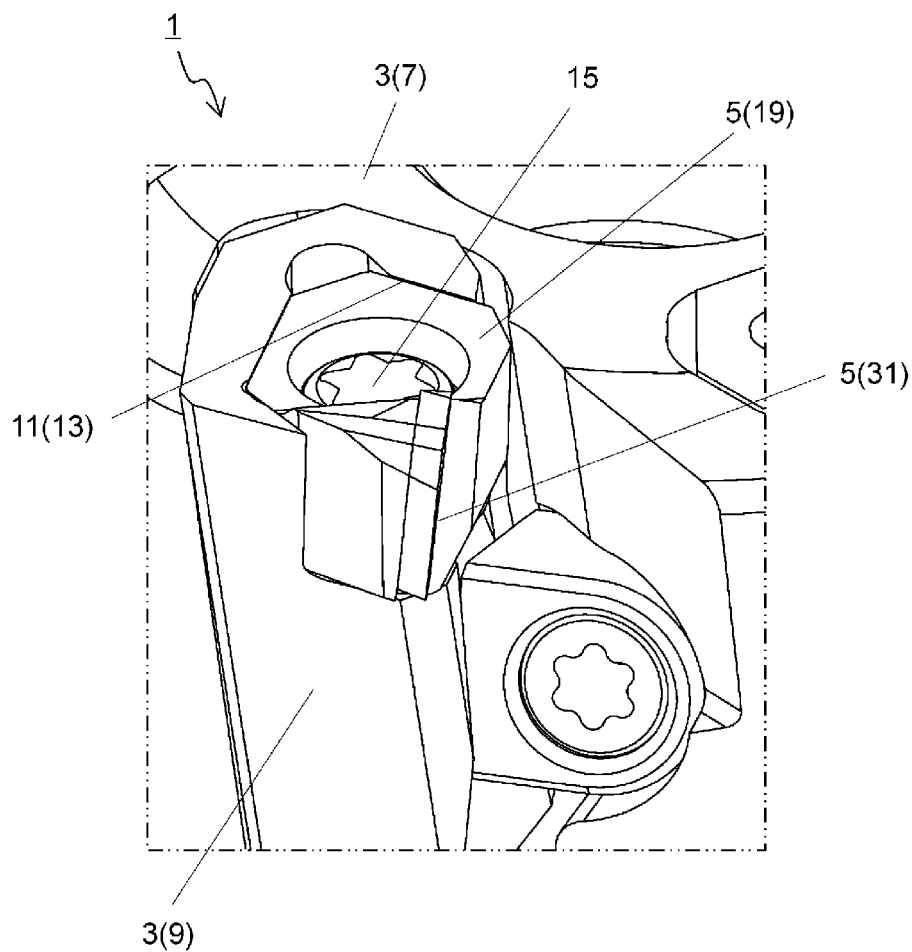
FIG. 4 is an enlarged view of a region A2 illustrated in FIG. 3.
Figure 5:
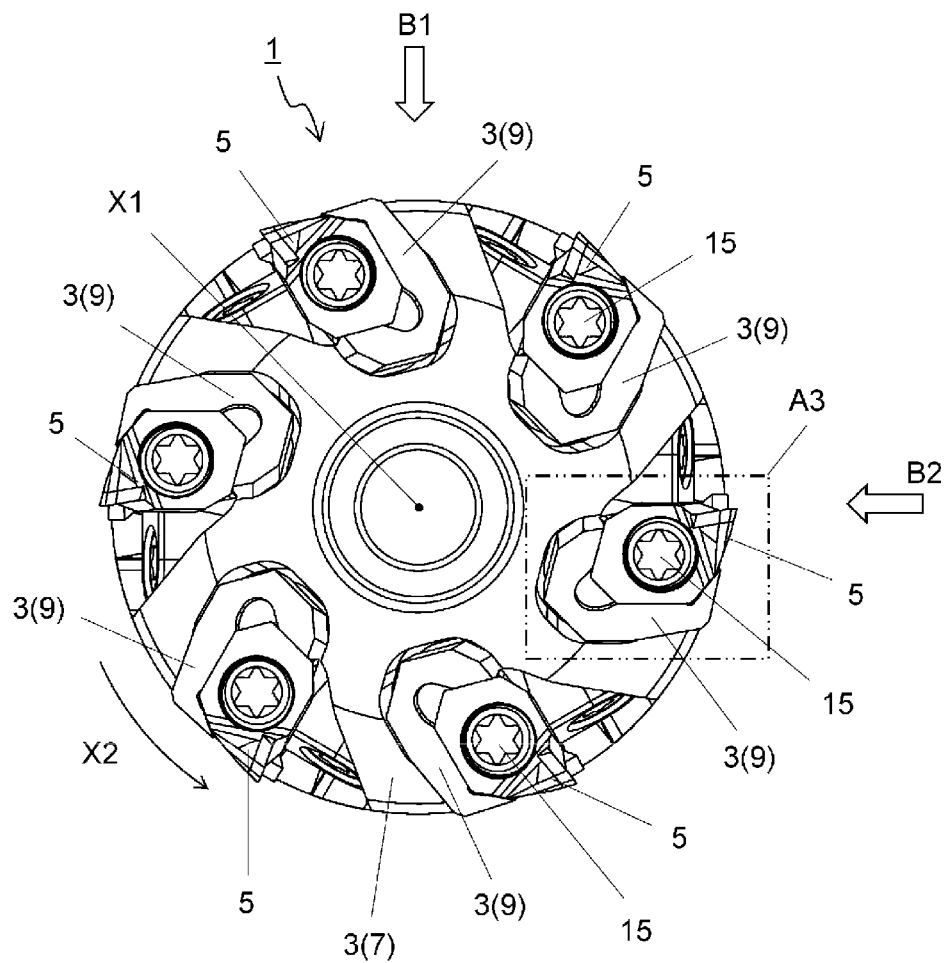
FIG. 5 is a front view of a first end of the cutting tool illustrated in FIG. 1.

In the following, the first end is referred to as the front end, and the second end is referred to as the rear end. Further, the side near the rotational axis X1 is referred to as the inner side, and the side away from the rotational axis X1 is referred to as the outer peripheral side. Further, the direction from the rear end toward the front end of the holder 3 is referred to as the front end direction, and the direction from the front end toward the rear end of the holder 3 is referred to as the rear end direction. FIG. 1 is a perspective view of the cutting tool 1 that allows confirmation of the rear end side. FIG. 3 is a perspective view of the cutting tool 1 that allows confirmation of the front end side.

The holder 3 of the present embodiment includes a main body portion 7 and a plurality of fixing members 9. The main body portion 7 is a member having a circular columnar body that extends in the rear end direction along the rotational axis X1. A plurality of openings 7a are provided on the outer peripheral side of the front end side of the main body portion 7. The plurality of fixing members 9 are, in general, quadrilateral columnar bodies screw-fastened to the plurality of openings 7a of the main body portion 7.

The fixing member 9 is a member for fixing the insert 5 to the main body portion 7. The fixing member 9, while generally a quadrilateral columnar body, has a partially cut-out shape. In other words, each of the fixing members 9 is a quadrilateral columnar body that includes a recessed portion. This recessed portion is a placement portion 11 on which the insert 5 is mounted.

A pocket 13 is formed by the opening 7a of the main body portion 7 and the placement portion 11 of the fixing member 9. While the present embodiment illustrates an example in which the holder 3 includes a plurality of the pockets 13, the holder 3 may be configured to include only one pocket 13.

The plurality of pockets 13 may be provided at equal intervals and be rotationally symmetrical about the rotational axis X1, or may be provided at unequal intervals. To suppress variation in a cutting load applied to the inserts 5 mounted on each of the pockets 13, the plurality of pockets 13 are preferably at equal intervals, that is, the spacing between the adjacent pockets 13 is preferably constant.

For the main body portion 7 and the fixing members 9 constituting the holder 3, high strength steel may be used. Note that cast iron, aluminum alloy, or the like may also be used. The size of the main body portion 7 is selected suitably depending on the size of the work material. For example, the length along the rotational axis X1 is set to about from 30 to 90 mm. Further, the width (diameter) in a direction orthogonal to the rotational axis X1 is set to about from 20 to 500 mm.

As is clear from the holder 3 including the plurality of pockets 13, the shape of the holder 3, in other words, the main body portion 7, is not strictly a circular columnar body.

The inserts 5 mounted on the placement portions 11 of the pockets 13 are fixed to the fixing members 9 by a screw 15.

In the present embodiment, the holder 3 includes six pockets 13. In the illustrated example, one insert 5 is disposed in each of the six pockets 13. Therefore, the cutting tool 1 of the present embodiment includes six inserts 5. Note that the number of pockets 13 and the number of inserts 5 mounted on the holder 3 are not limited to six. Even if these numbers are one to five or seven or greater, the result is unproblematic.

While the holder 3 may be configured by one member, when the holder 3 includes the main body portion 7 and the fixing member 9 as in the present embodiment, it is possible to replace only the fixing member 9, which is relatively susceptible to damage by the mounting and removal of the insert 5, resulting in excellent economic efficiency.

The insert 5 of the present embodiment is a columnar body that includes a cutting edge 29, as illustrated in FIGS. 15 to 18. Specifically, the insert 5 is a quadrilateral columnar body provided with an upper surface 17 having a quadrilateral shape, a lower surface 19 having a quadrilateral shape, and side surfaces disposed between the upper surface 17 and the lower surface 19. When the insert 5 is mounted on the holder 3, the upper surface 17 is disposed on the rear end side, and the lower surface 19 is disposed on the front end side. The side surfaces include four surface regions of a first side surface 21, a second side surface 23, a third side surface 25, and a fourth side surface 27 corresponding to each side portion of the upper surface 17 and the lower surface 19 having quadrilateral shapes.

When the insert 5 is mounted on the holder 3, the upper surface 17 is a surface disposed on the rear end side of the holder 3 and in contact with the placement portion 11 of the holder 3. Further, when the insert 5 is mounted on the holder 3, the lower surface 19 is a surface that is disposed on the front end side of the holder 3 and projects further in the front end direction than the holder 3.

The first side surface 21 is a surface region disposed backward in the rotational direction X2 about the rotational axis X1 when the insert 5 is mounted on the holder 3. Thus, in the following, the first side surface 21 is referred to as the rear side surface 21. The rear side surface 21 is in contact with the placement portion 11 when the insert 5 is mounted on the holder 3.

The fourth side surface 27 is a surface region disposed forward in the rotational direction X2 about the rotational axis X1 when the insert 5 is mounted on the holder 3. Thus, in the following, the fourth side surface 27 is referred to as the front side surface 27. The front side surface 27 is disposed on the side opposite to the rear side surface 21, and has a rectangular shape that is long in the direction orthogonal to the rotational axis X1 when viewed from the forward side in the rotational direction X2.

The second side surface 23 is a surface region disposed on the inner side when the insert 5 is mounted on the holder 3. Thus, in the following, the second side surface 23 is referred to as the inner side surface 23. The inner side surface 23 is in contact with the placement portion 11 when the insert 5 is mounted on the holder 3.

The third side surface 25 is a surface region disposed on the outer peripheral side when the insert 5 is mounted on the holder 3. Thus, in the following, the third side surface 25 is referred to as the outer side surface 25. The outer side surface 25 projects further in the outer peripheral direction than the holder 3 when the insert 5 is mounted on the holder 3. Note that, in the present embodiment, a portion of the outer side surface 25 on the front side surface 27, not the outer side surface 25 overall, partially projects further in the outer peripheral direction than the holder 3.

Each of the four surface regions of the rear side surface 21, the inner side surface 23, the outer side surface 25, and the front side surface 27, in general, has a quadrilateral shape with four corner portions.

Note that each of the upper surface 17, the lower surface 19, the front side surface 27, the rear side surface 21, the outer side surface 25, and the inner side surface 23 having a "quadrilateral shape" means that each can generally have a quadrilateral shape, and not necessarily a quadrilateral shape in a strict sense. The four corner portions of each surface region can each have a rounded shape when viewed from the front, and the side portions connect neighboring corner portions need not have a strictly straight line shape, but can have a shape in which a portion thereof has unevenness.

The insert 5 includes the cutting edge 29 on at least a part of the ridge line of neighboring surfaces. In the insert 5 of the present embodiment, the cutting edge 29 is disposed on at least a part of the ridge line where the front side surface 27 and the outer side surface 25 intersect, and at least a part of the ridge line where the front side surface 27 and the lower surface 19 intersect.

Specifically, an outer periphery cutting edge 31 is formed on the ridge line where the front side surface 27 and the outer side surface 25 intersect. Further, a front end cutting edge 33 is formed on the ridge line where the front side surface 27 and the lower surface 19 intersect. That is, the cutting edge 29 of the present embodiment includes the outer periphery cutting edge 31 and the front end cutting edge 33. A length of the outer periphery cutting edge 31 is set, for example, to about from 1 to 10 mm. A length of the front end cutting edge 33 is set, for example, to about from 0.5 to 10 mm.

The cutting tool 1 of the present embodiment can be used for so-called milling, and cuts a work material by moving in a direction generally orthogonal to the rotational axis X1 while the holder 3 rotates about the rotational axis X1. As a result, the outer periphery cutting edge 31 may be made to function as a "main cutting edge" that mainly cuts the work material, and the front end cutting edge 33 may be made to function as a "flat cutting edge" that reduces the unevenness of the machined surface of the work material.

The outer periphery cutting edge 31 and the front end cutting edge 33 are formed on an outer peripheral edge of the front side surface 27, and the front side surface 27 is disposed forward in the rotational direction X2 about the rotational axis X1, causing the front side surface 27 to function as a "rake face" on which the chips flow when machining is performed. Further, the outer side surface 25 and the lower surface 19 function as "relief faces" when machining is performed.

Examples of the material of the insert 5 include cemented carbide alloy, cermet, or the like. Examples of the composition of the cemented carbide alloy include WC—Co, WC—TiC—Co, and WC—TiC—TaC—Co. Here, tungsten carbide (WC), titanium carbide (TiC), and tantalum carbide (TaC) are hard particles, and cobalt (Co) is a binding phase.

Further, cermet is a sintered composite material obtained by combining a metal with a ceramic component. Specifically, examples of the cermet include titanium compounds in which TiC or titanium nitride (TiN) is the main component.

The surface of the insert 5 may be coated with a coating film using a chemical vapor deposition (CVD) method or a physical vapor deposition (PVD) method. Examples of the composition of the coating film include TiC, TiN, titanium carbonitride (TiCN), alumina ($Al_2O_3$), and the like. Further, to enhance the strength of the cutting edge portion, the insert 5 may be configured by brazing a diamond sintered compact or a cubic boron nitride (CBN) sintered compact on a substrate made from the above-described materials.

The insert 5 of the present embodiment intersects the lower surface 19, and includes a through-hole 35 disposed from the lower surface 19 to the upper surface 17. The through-hole 35 of the present embodiment is formed from the lower surface 19 along the rotational axis X1. The through-hole 35 of the present embodiment does not open to the front side surface 27, the outer side surface 25, the rear side surface 21, or the inner side surface 23.

The through-hole 35 is an area for screwing the insert 5 into the holder 3. That is, the screw 15 is inserted into the through-hole 35 of the insert 5 and the leading end of this screw 15 is inserted into a screw hole 9a formed in the fixing member 9 such that the insert 5 is fixed to the fixing member 9 of the holder 3.

Figure 16:
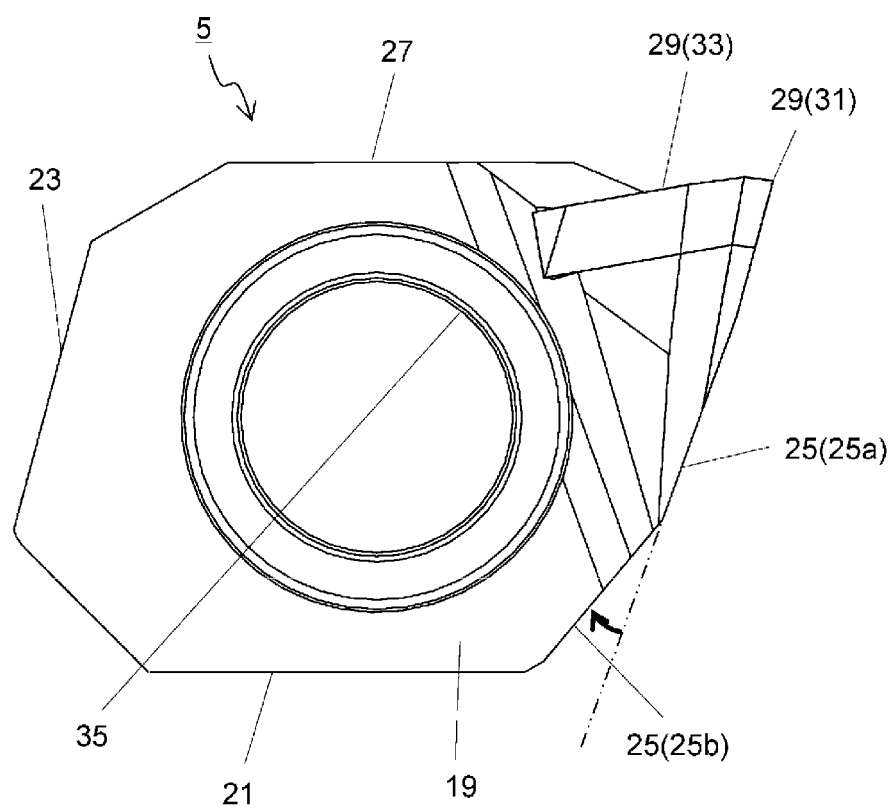
FIG. 16 is a plan view of the insert illustrated in FIG. 15.
Figure 17:
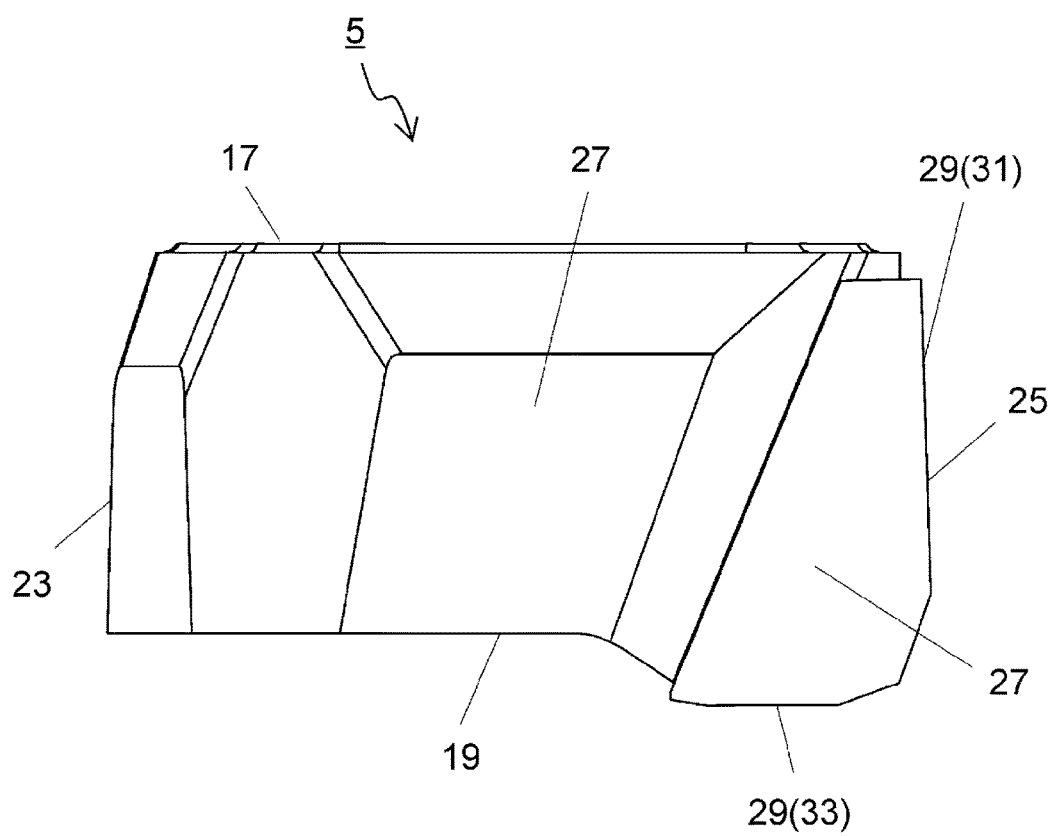
FIG. 17 is a side view of the insert illustrated in FIG. 16 as viewed toward a front side surface.
Figure 18:
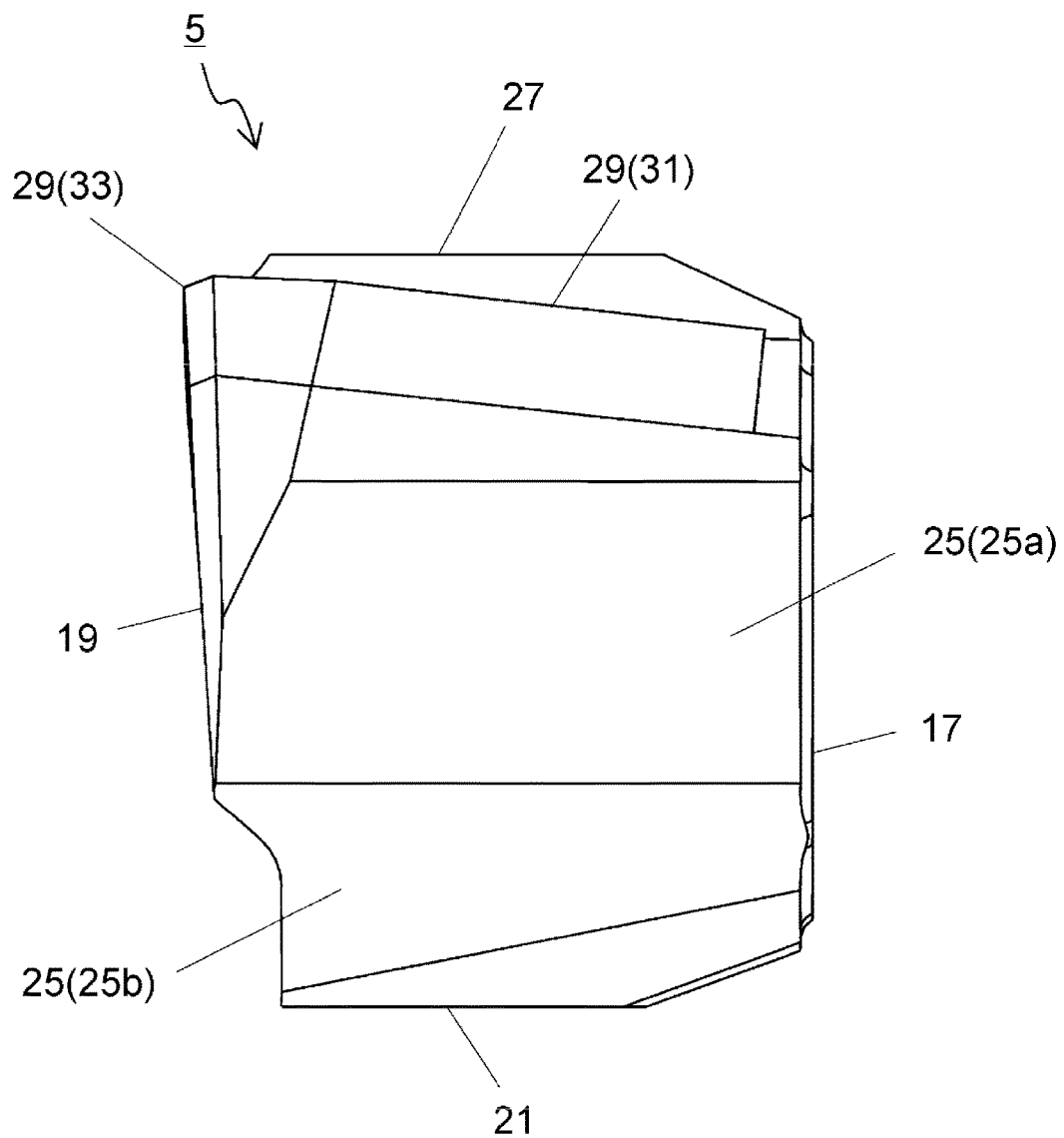
FIG. 18 is a side view of the insert illustrated in FIG. 16 as viewed toward an outer side surface.

Although the size of the insert 5 is not particularly limited, for example, the maximum value of the width in a direction from the front side surface 27 toward the rear side surface 21 in a plan view such as illustrated in FIG. 16 is set to about from 5 to 20 mm. In addition, the maximum value of the width in a direction from the inner side surface 23 toward the outer side surface 25 is set to about from 5 to 20 mm. Further, the maximum value of the thickness from the upper surface 17 to the lower surface 19 along the central axis of the through-hole 35 is from 3 to 10 mm.

In the cutting tool 1 of the present embodiment, the inserts 5 are each mounted on the holder 3 so that the outer periphery cutting edge 31 inclines with respect to the rotational axis X1. This angle of inclination is a so-called axial rake, and can be set to about from 0 to 20°, for example, in the present embodiment.

Figure 10:
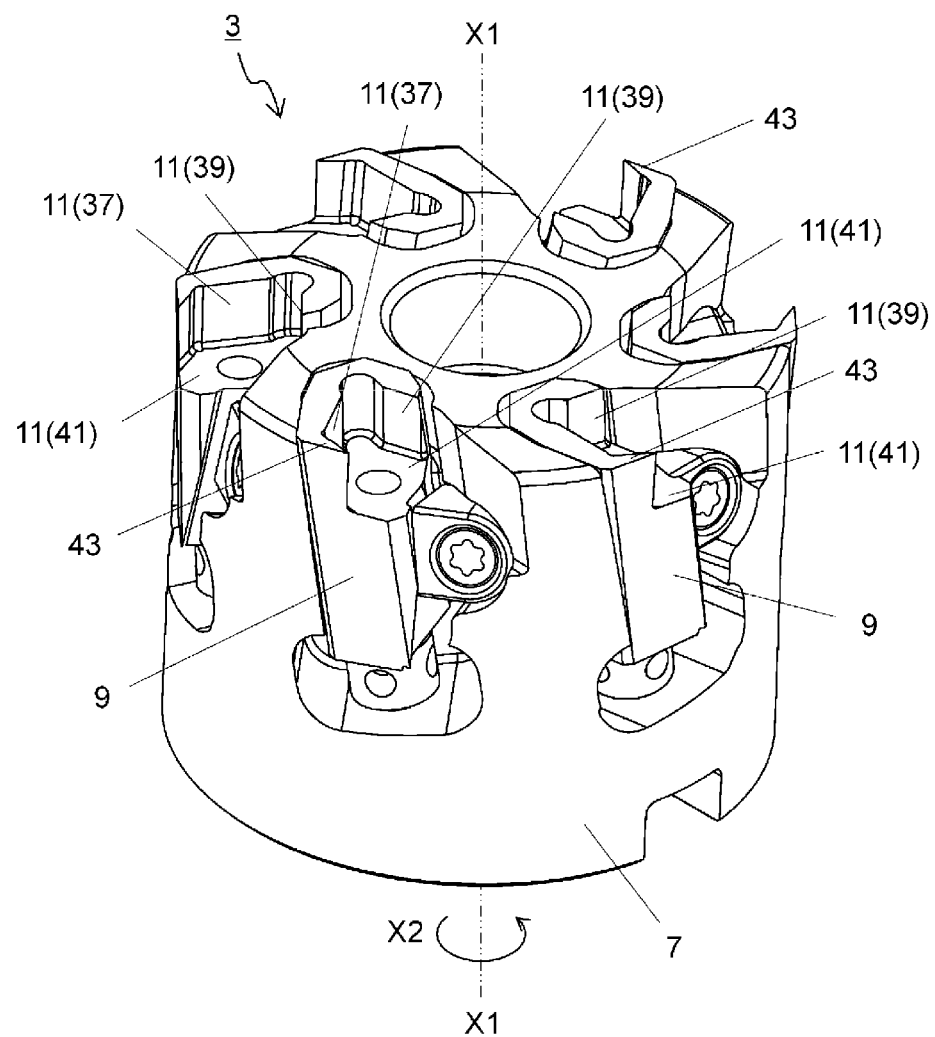
FIG. 10 is a perspective view illustrating a holder of an embodiment.
Figure 11:
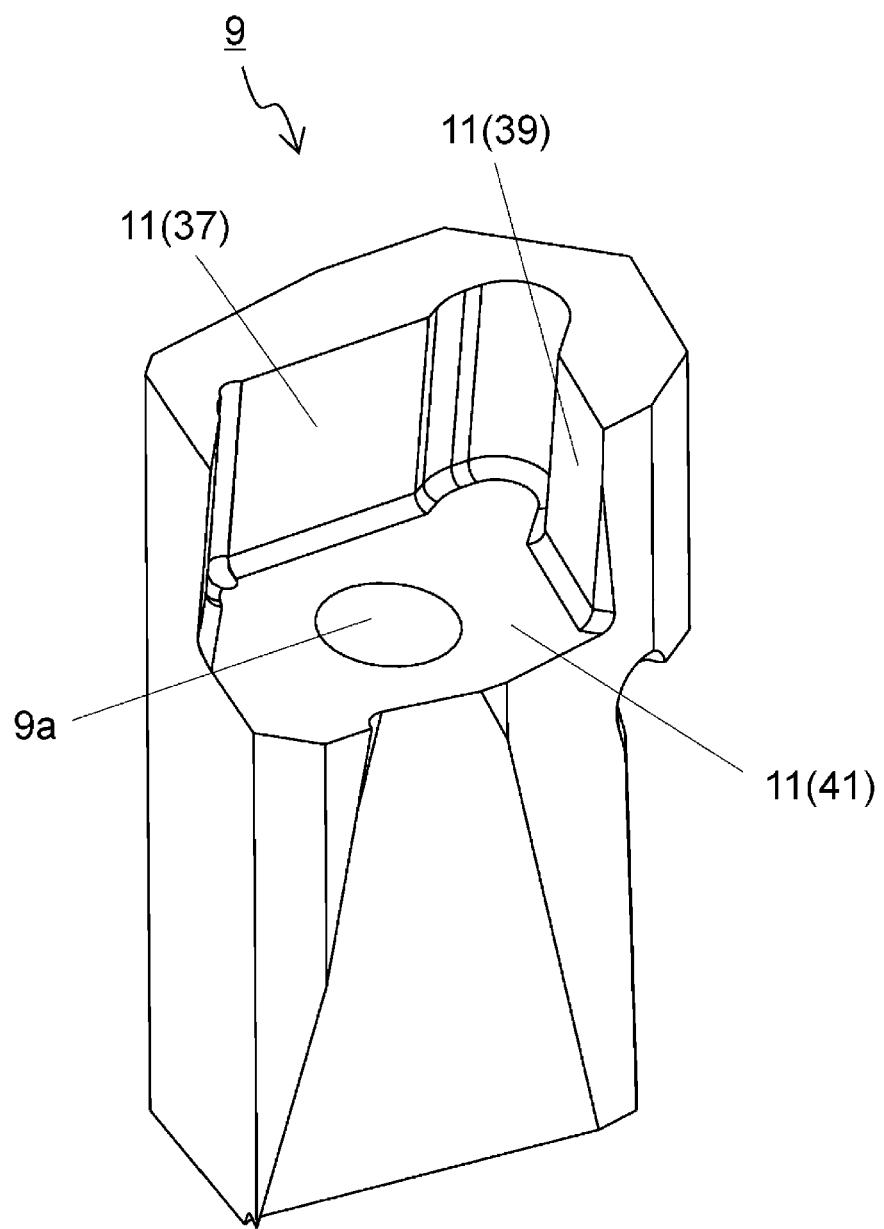
FIG. 11 is a perspective view of a fixing member constituting the holder in FIG. 10.

The placement portion 11 of the fixing member 9 includes a first surface 37, a second surface 39, a third surface 41, and a projecting portion 43, as illustrated in FIG. 10. The first surface 37 faces forward in the rotational direction X2 of the rotational axis X1, and is in contact with the rear side surface 21 of the insert 5.

The second surface 39 is disposed further forward in the rotational direction X2 of the rotational axis X1 than the first surface 37 and on the radial inner side of the holder 3. The second surface 39 of the present embodiment faces toward the outer peripheral side of the holder 3. The second surface 39 is in contact with the inner side surface 23 of the insert 5.

Figure 12:
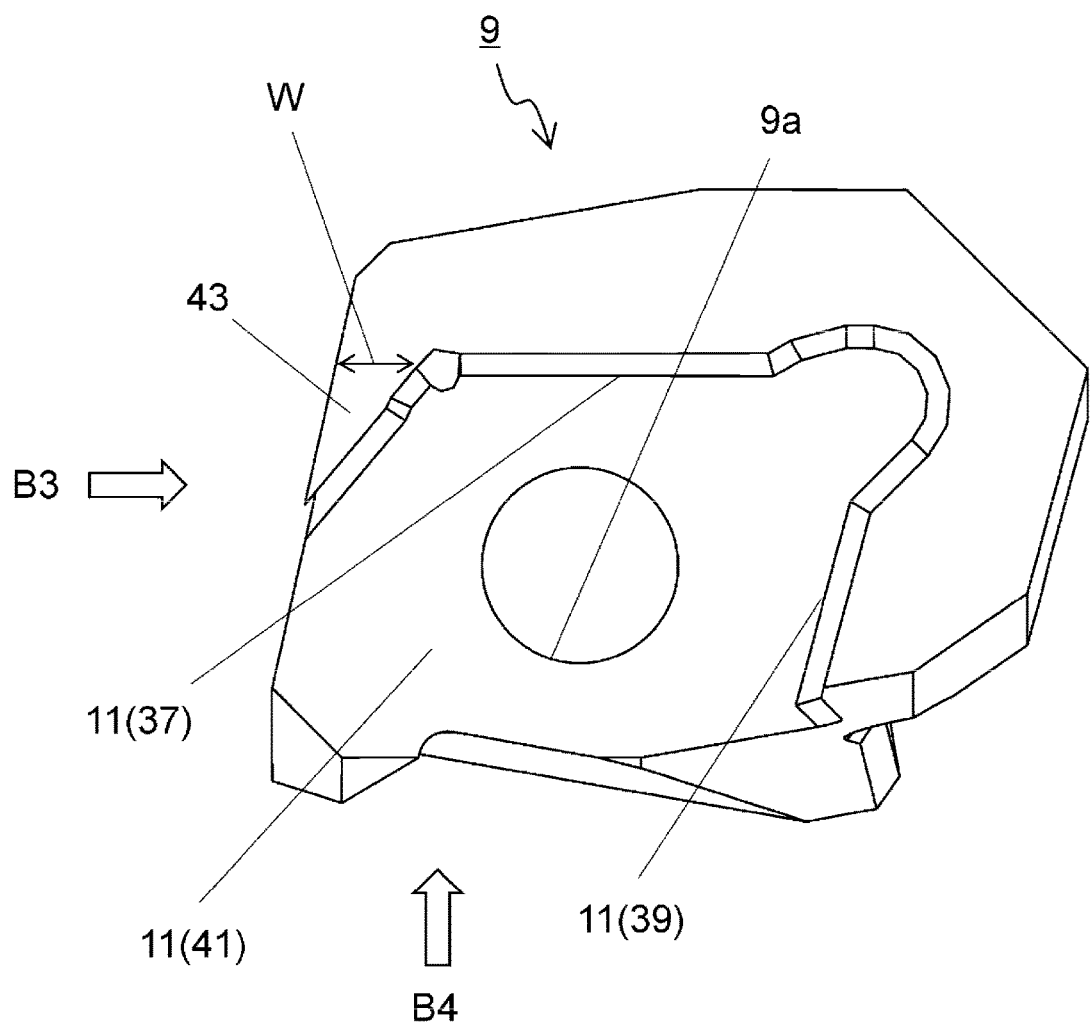
FIG. 12 is a front view of the fixing member illustrated in FIG. 11.
Figure 13:
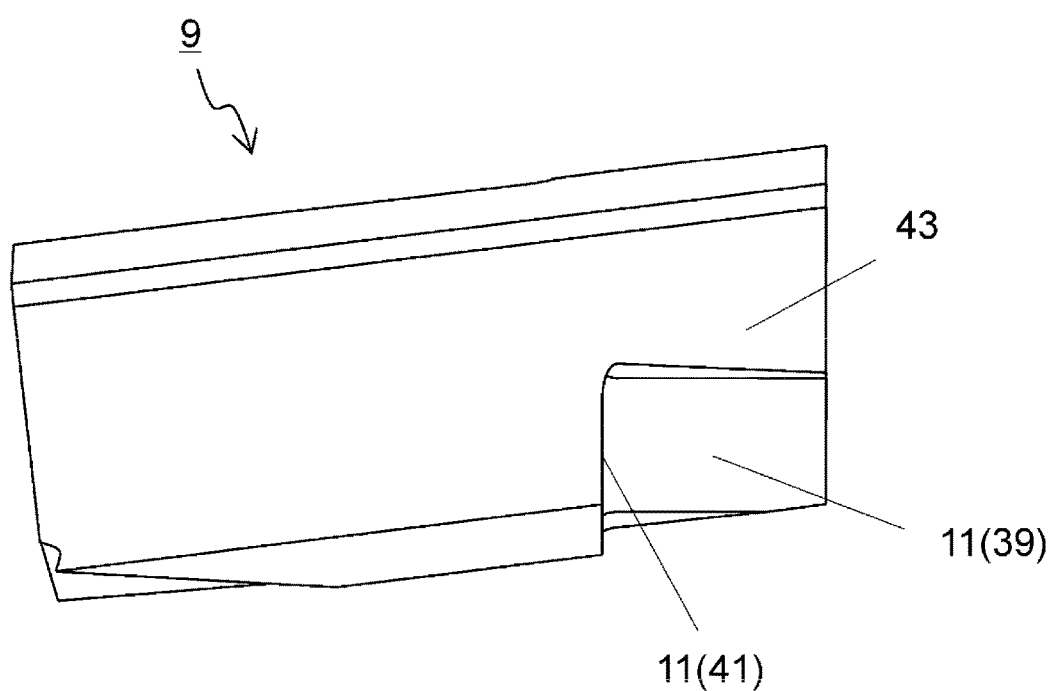
FIG. 13 is a side view of the fixing member viewed in a direction B3 in FIG. 11.
Figure 14:
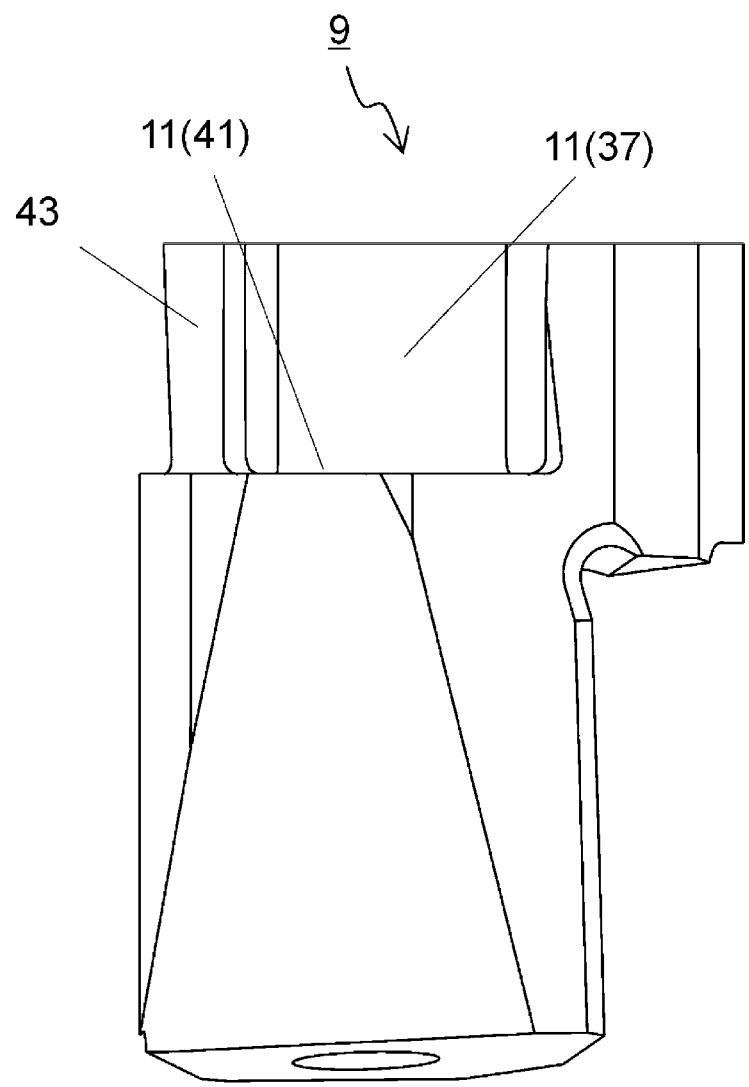
FIG. 14 is a side view of the fixing member viewed in a direction B4 in FIG. 11.
Figure 15:
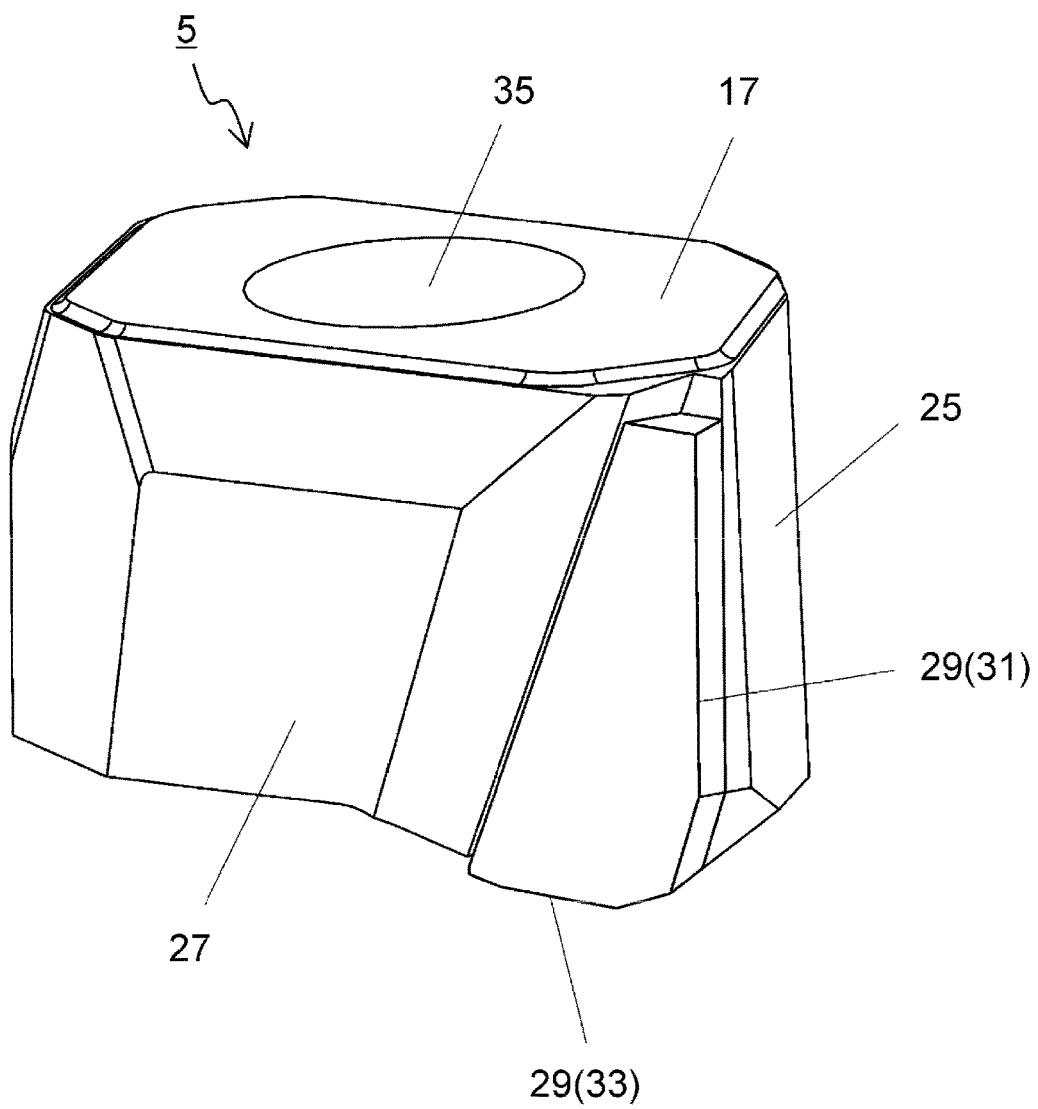
FIG. 15 is a perspective view of an insert of an embodiment.

The third surface 41, as illustrated in FIG. 12, is adjacent to the first surface 37 and the second surface 39 and faces toward the front end side of the holder 3. The third surface 41 is in contact with the upper surface 17 of the insert 5. The rear side surface 21, the inner side surface 23, and the upper surface 17 of the insert 5 are in contact with the first surface 37, the second surface 39, and the third surface 41 of the placement portion 11, respectively, positioning the insert 5 on the placement portion 11.

The projecting portion 43 is disposed further on the radial outer circumferential side of the holder 3 than the first surface 37, and projects forward in the rotational direction X2 of the rotational axis X1. The projecting portion 43 of the present embodiment is adjacent to the first surface 37 on the radial outer circumferential side of the holder 3. The projecting portion 43 is disposed further outward than the outer side surface 25 of the insert 5 when mounted on the placement portion 11, and projects backward to forward in the rotational direction X2 of the rotational axis X1.

When a soft material such as an aluminum alloy is machined, the cutting tool 1 may rotate at an extremely high rotational frequency, such as a rotational frequency per minute of several 1000 to several 10000 rotations. When the cutting tool 1 is rotated at an extremely high rotational frequency in this manner, an extremely large centrifugal force is applied to the insert 5.

The insert 5 of the present embodiment is fixed to the fixing member 9 by the screw 15. In the present embodiment, the screw 15 that fixes the insert 5 to the fixing member 9 extends in a direction that is generally perpendicular to the rotational axis X1. Thus, in the case described above, a significant load is applied in the direction generally orthogonal to a central axis of the screw 15 by the centrifugal force onto the screw 15 that fixes the insert 5 to the fixing member 9. As a result, the screw 15 may bend.

The placement portion 11 of the present embodiment is disposed further on the radial outer circumferential side of the holder 3 than the first surface 37, and includes the projecting portion 43 that projects forward in the rotational direction X2 of the rotational axis X1. In other words, the placement portion 11 of the present embodiment includes the projecting portion 43 disposed further outward than the outer side surface 25 of the insert 5.

As a result, even if the screw 15 that fixes the insert 5 temporarily bends, the insert 5 is hooked onto this projecting portion 43, simply keeping the insert 5 from popping out. Nevertheless, a force rotating in the direction indicated by the arrow Y in FIG. 7 with the projecting portion 43 serving as the center is applied by the centrifugal force described above onto the insert 5 hooked onto the projecting portion 43.

Figure 6:
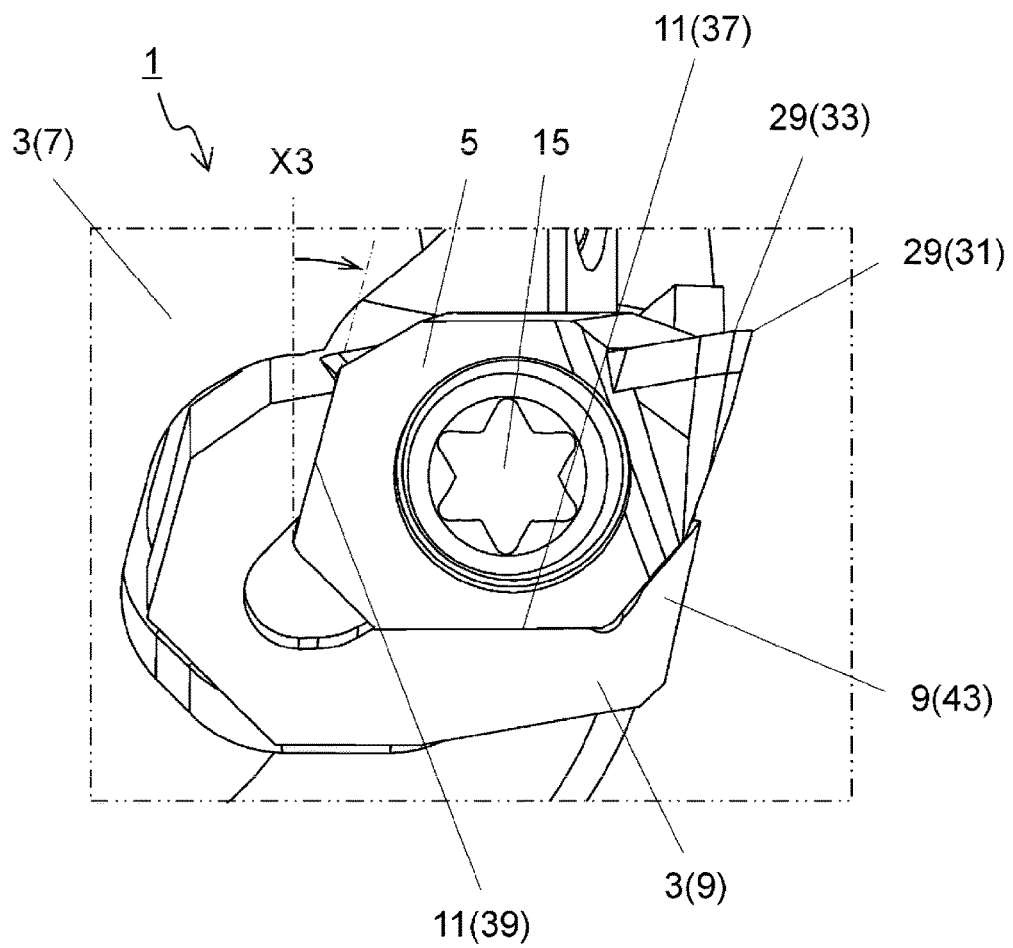
FIG. 6 is an enlarged view of a region A3 illustrated in FIG. 5.
Figure 7:
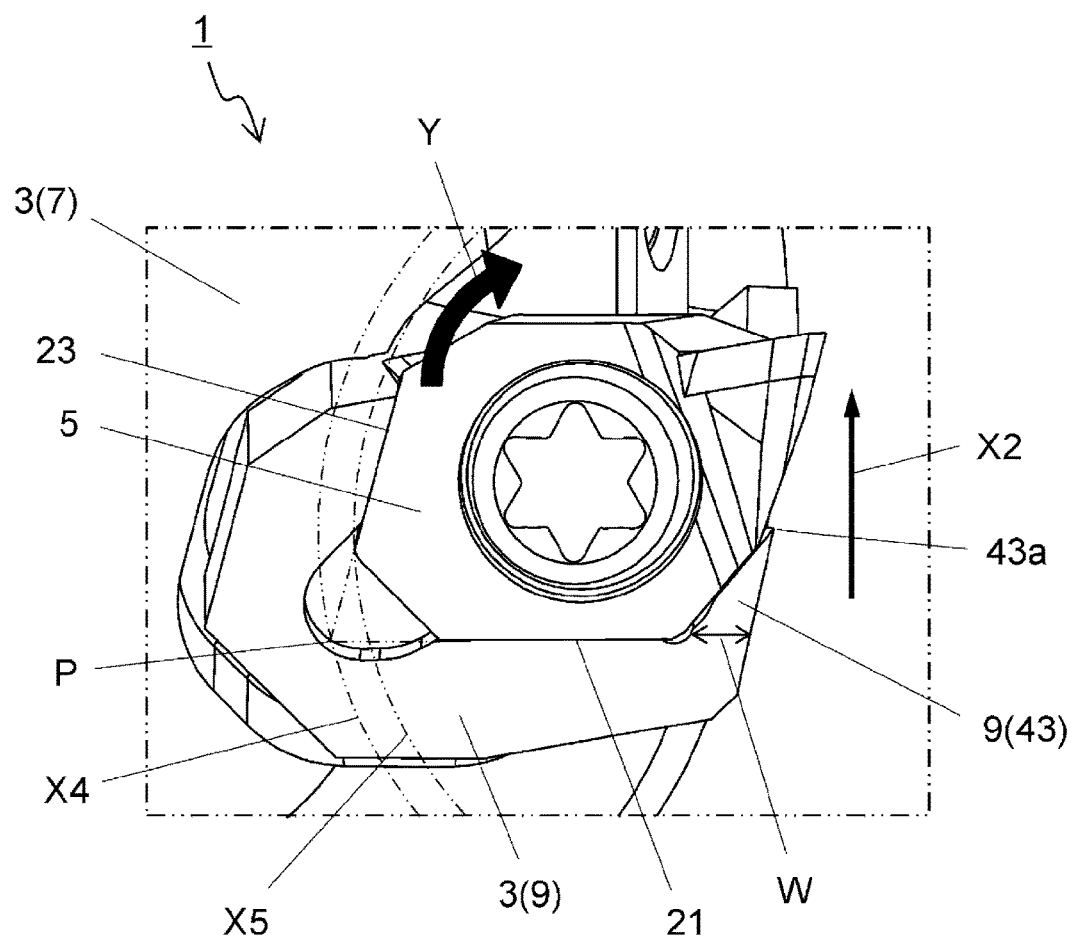
FIG. 7 is an enlarged view illustrating the same region as in FIG. 6.
Figure 8:
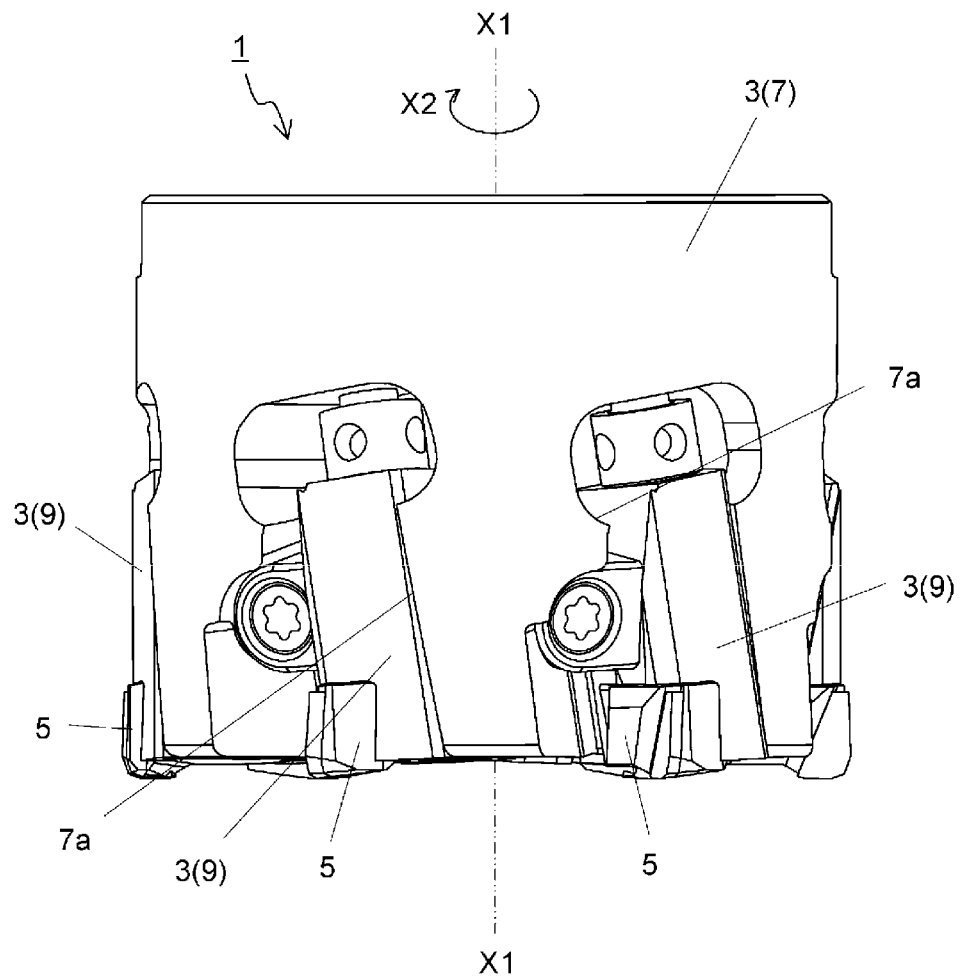
FIG. 8 is a side view of the cutting tool viewed in a direction B1 in FIG. 5.
Figure 9:
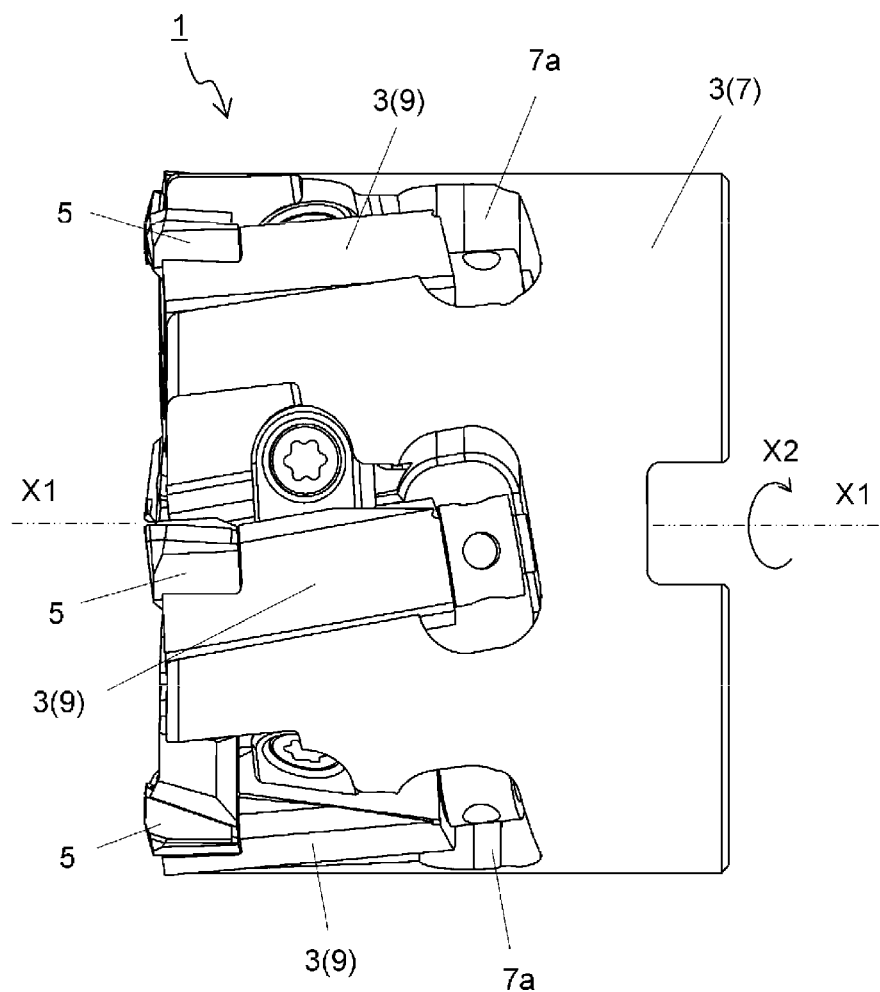
FIG. 9 is a side view of the cutting tool viewed in a direction B2 in FIG. 5.

In the cutting tool 1 of the present embodiment, as illustrated in FIG. 6 and FIG. 7, which are enlarged views of the front view (front end view) of the first end, at least a portion of the second surface 39 of the placement portion 11 is inclined and comes closer to the outer circumference of the holder 3 as going forward in the rotational direction X2 of the rotational axis X1. In the present embodiment, in other words, the second surface 39 of the placement portion 11 is inclined and separates from the rotational axis X1 as going forward in the rotational direction X2 of the rotational axis X1.

Specifically, as illustrated in FIG. 6, for example, the second surface 39 of the placement portion 11 is inclined and comes closer to the outer circumference of the holder 3. Here, "is inclined and comes closer to the outer circumference of the holder 3" means that the second surface 39 is disposed on the outer peripheral side of the holder 3 as illustrated in FIG. 6 with respect to a virtual line X3 that extends from the rear end of the second surface 39 disposed backward in the rotational direction X2 and that is orthogonal to a line that connects the rotational axis X1 and the outer periphery cutting edge 31.

With the second surface 39 configured as described above, even when the force rotating in the direction of the arrow Y is applied to the insert 5 as a result of the centrifugal force, the rotation of the insert 5 in the direction of the arrow Y is suppressed by the projecting portion 43 and the second surface 39. As a result, sudden pop-out of the insert 5 is suppressed. The inclination of the second surface 39 with respect to the virtual line X3 is set to about from 10 to 30°, for example.

With the second surface 39 and the projecting portion 43 suppressing the sudden pop-out of the insert 5, even if the screw 15 that fixes the insert 5 bends, for example, the fixing member 9 can be flexibly replaced.

Further, in the cutting tool 1 of the present embodiment, the second surface 39 of the placement portion 11 is in contact with the inner side surface 23 and not the front side surface 27 of the insert 5. That is, the insert 5 of the present embodiment is exposed in the region from the section in contact with the second surface 39 to the cutting edge 29 in a reverse rotational direction of the rotational axis X1. As a result, the space where the chips flow can be maintained without hindering the flow of the chips on the front side surface 27. As a result, it is possible to discharge chips to the outside in a stable manner while favorably fixing the insert 5 to the holder 3.

The shape of the projecting portion 43 is not particularly limited as long as it is possible to prevent the insert 5 from popping out by the centrifugal force. In the projecting portion 43 of the present embodiment, a width W decreases as going forward in the rotational direction X2 of the rotational axis X1 when viewed from the front end. In other words, in the projecting portion 43 of the present embodiment, the width W of a base portion disposed further backward in the rotational direction X2 of the rotational axis X1 than the front end section disposed forward in the rotational direction X2 of the rotational axis X1 is large. Note that the width W described above refers to the width in the radial direction of the rotational axis X1.

With the width W of the base portion of the projecting portion 43 being large, the projecting portion 43 exhibits increased durability and becomes less susceptible to bending. This makes it possible to stably prevent pop-out of the insert 5 at the projecting portion 43. Further, because the width W in the radial direction of the projecting portion 43 overall is not configured to be large, excessive projection of the projecting portion 43 to the outer peripheral side and interference of the projecting portion 43 with the work material are avoided.

The width W of the base portion of the projecting portion 43 can be set to from 5 to 20%, for example, with respect to the width of the insert 5 in the radial direction of the rotational axis X1. The length of the projecting portion 43 in the rotational direction X2 can be set to about from 10 to 40%, for example, with respect to the length in the rotational direction X2 of the insert 5. Further, the inner face of the projecting portion 43 is set so as to incline at about from 100 to 150°, for example, with respect to the first surface 37 when viewed from the front end.

In the cutting tool 1 of the present embodiment, when a virtual circle X4 is provided that passes through a section P where the rear side surface 21 and the inner side surface 23 of the insert 5 intersect with an end portion 43a of the projecting portion 43 disposed forward in the rotational direction X2 of the rotational axis X1, the second surface 39 is disposed on the inner side of the virtual circle X4, when viewed from the front end as illustrated in FIG. 7.

As previously described, a force rotating in the direction indicated by the arrow Y with the projecting portion 43 serving as the center, more specifically, with the end portion 43a of the projecting portion 43 serving as the center, is applied by the centrifugal force onto the insert 5 hooked onto the projecting portion 43. At this time, the second surface 39 is disposed on the inner side of the virtual circle X4, thereby more reliably stopping the rotation of the insert 5 itself in the direction of the arrow Y with the second surface 39. As a result, sudden pop-out of the insert 5 is more reliably suppressed.

To more reliably stop the rotation of the insert 5 itself in the direction of the arrow Y with the second surface 39, the second surface 39 is more preferably configured as described below. In the cutting tool 1 of the present embodiment, when a virtual circle X5 is provided that passes through the rear end of the inner side surface 23 of the insert 5, with the end portion 43a of the projecting portion 43 serving as the center point, the second surface 39 is disposed on the inner side of the virtual circle X5, when viewed from the front end illustrated in FIG. 7.

Further, the ridge line where the rear side surface 21 and the outer side surface 25 of the insert 5 having a quadrilateral columnar shape intersect is separated from the surface of the pocket 13. When this ridge line comes into contact with the pocket 13 of the holder 3, a load associated with a cutting resistance during machining readily concentrates in the location of the pocket 13 brought into contact with the ridge line. This location is near the projecting portion 43, possibly causing damage to the projecting portion 43. Nevertheless, the ridge line is separated from the pocket 13, thereby avoiding concentration of the stress described above, making it possible to increase the durability of the projecting portion 43.

The outer side surface 25 of the insert 5 of the present embodiment includes a first region 25a disposed on the side of the front side surface 27, and a second region 25b disposed on the side of the rear side surface 21, as illustrated in FIG. 16. The second region 25b inclines with respect to the first region 25a and comes close to the rotational axis X1 as the second region 25b comes close to the rear side surface 21, with the first region 25a serving as reference. Then, as illustrated in FIG. 7 and FIG. 16, the projecting portion 43 of the placement portion 11 is disposed outward from the second region 25b of the outer side surface 25. As a result, the width of the projecting portion 43 in the radial direction of the rotational axis X1 readily increases. This makes it possible to increase the strength of the projecting portion 43.

Further, in the present embodiment, the surface of the projecting portion 43 that faces the insert 5, that is, the inner surface of the projecting portion 43, is separated from the insert 5. When the projecting portion 43, in addition to the first surface 37 and the second surface 39 of the placement portion 11, is separated from and not in contact with the insert 5, the insert 5 can be brought into contact with the first surface 37 and the second surface 39 in a stable manner. Accordingly, the insert 5 can be stably held by the fixing member 9.

In the present embodiment, the center of the screw 15 is disposed between the second surface 39 and the projecting portion 43 when viewed from the front end. When the work material is machined, a feed force is applied on the insert 5 from the cutting edge 29 toward the inner side. At this time, when the center of the screw 15 is disposed as described above, the feed force can be dispersed to the second surface 39 and the screw 15.

Further, for example, when a load is applied to the screw 15 by the centrifugal force, causing deformation, the centrifugal force is dispersed to the screw 15 and the projecting portion 43 when the center of the screw 15 is disposed as described above. This makes it possible to decrease the possibility of damage to the screw 15 and the projecting portion 43.

In the above, although the cutting tool 1 of the embodiment is described in detail with reference to the drawings, the cutting tool of the present invention is not limited to the constitutions of the above-mentioned embodiments.

Next, description will be given of a method for manufacturing a machined product of one embodiment using drawings.

The machined product is manufactured by carrying out machining on a work material 101. The method for manufacturing a machined product in the present embodiment is provided with the following steps. Specifically, the steps of:

(1) rotating the cutting tool 1 exemplified by the above-mentioned embodiments about the rotational axis X1;

(2) bringing the cutting edge 29 of the cutting tool 1 that is rotating into contact with the work material 101, and (3) separating the cutting tool 1 from the work material 101.

Figure 19:
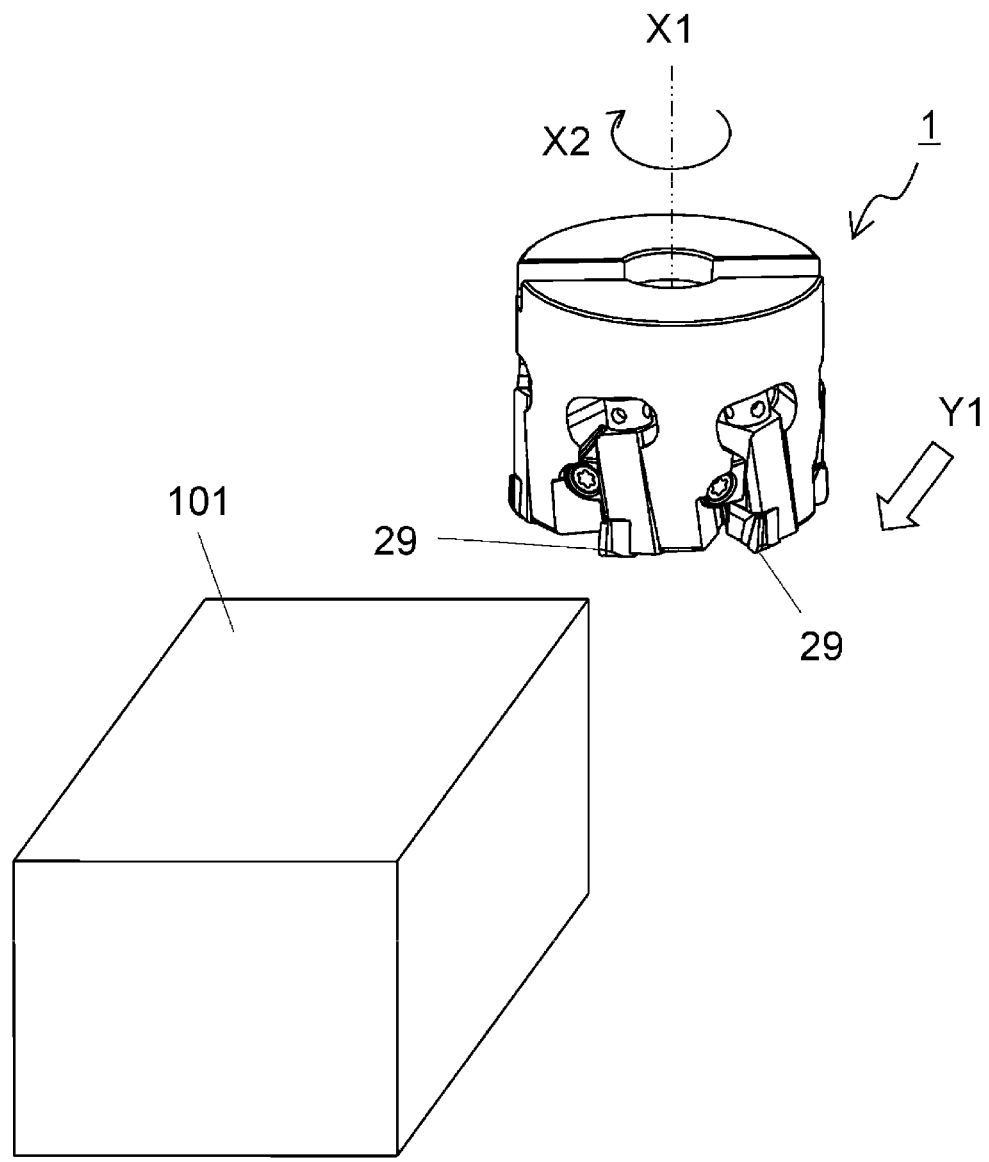
FIG. 19 is a schematic view illustrating one step of a method for manufacturing a machined product of an embodiment.
Figure 20:
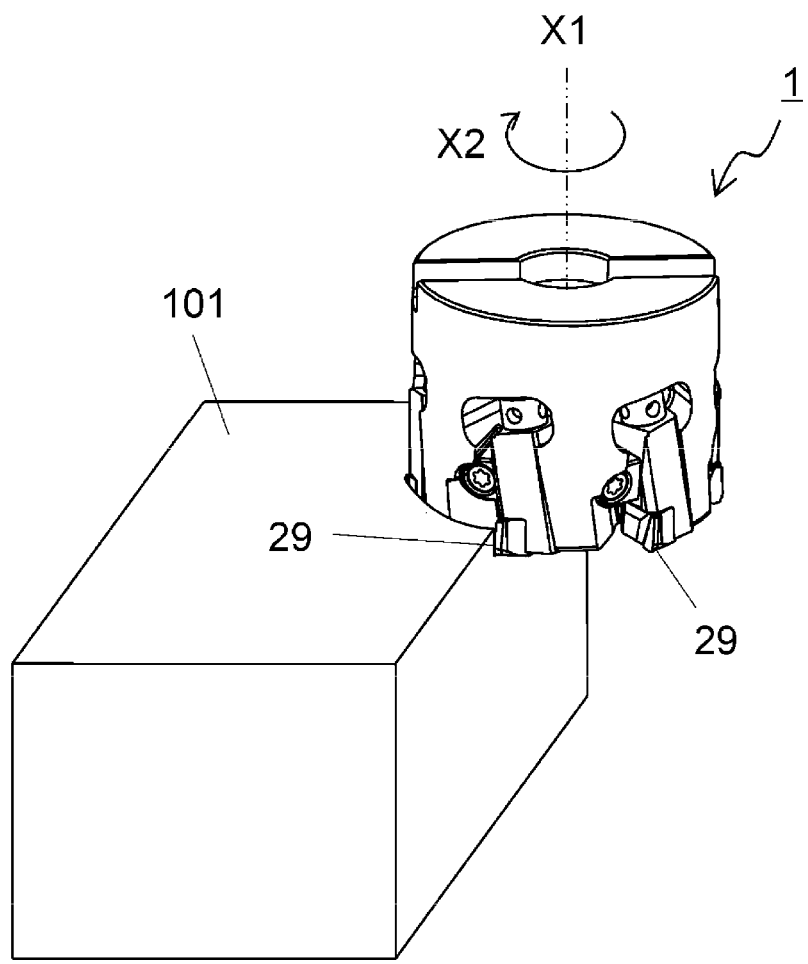
FIG. 20 is a schematic view illustrating one step of the method for manufacturing a machined product of an embodiment.
Figure 21:
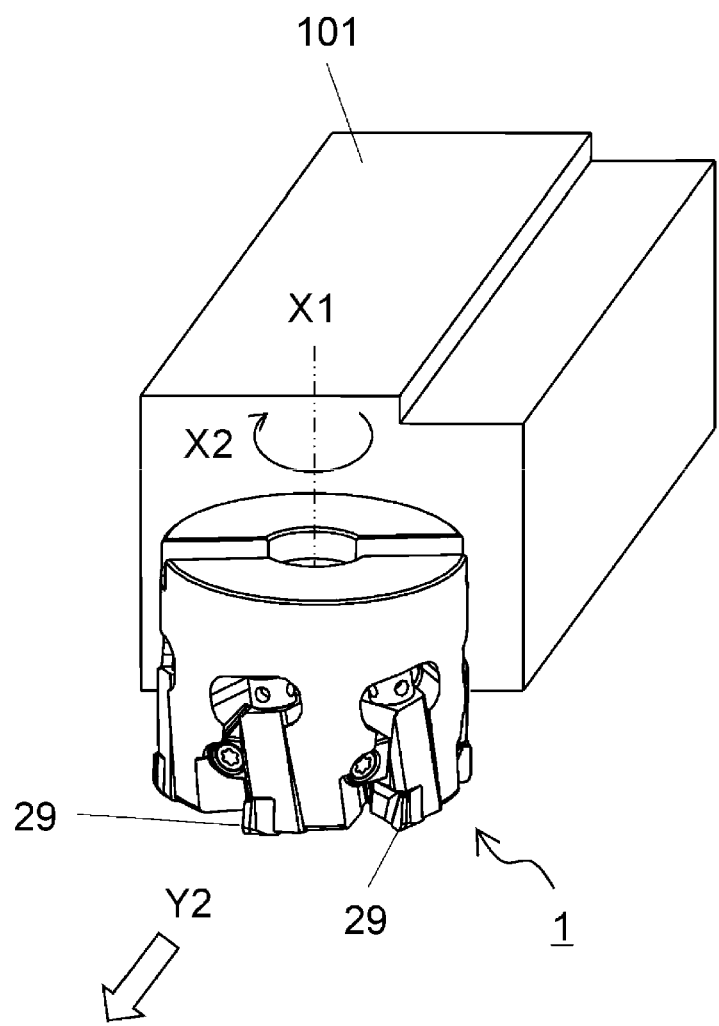
FIG. 21 is a schematic view illustrating one step of the method for manufacturing a machined product of an embodiment.

More specifically, firstly, as illustrated in FIG. 19, the cutting tool 1 is made to rotate about the rotational axis X1 and move in a Y1 direction, bringing the cutting tool 1 relatively close to the work material 101. Next, as illustrated in FIG. 20, the cutting edge 29 of the cutting tool 1 is brought into contact with the work material 101 to cut the work material 101. In the present embodiment, as the cutting edge 29, the front tip cutting edge and the outer periphery cutting edge of the insert are being made to come into contact with the work material 101. Then, as illustrated in FIG. 21, the cutting tool 1 is relatively moved away from the work material 101 by moving the cutting tool 1 in a Y2 direction.

In the present embodiment, the cutting tool 1 is brought close to the work material 101 in a state where the work material 101 is fixed and the cutting tool 1 is rotating about the rotational axis X1. Further, in FIG. 20, the work material 101 is cut by making the cutting edge 29 of the insert that is rotating come into contact with the work material 101. Further, in FIG. 21, the cutting tool 1 in the rotated state is being moved away from the work material 101.

Further, in the machining of the manufacturing method of the present embodiment, in each of the respective steps, although the cutting tool 1 is brought into contact with or separated from the work material 101 by moving the cutting tool 1, the present embodiment is of course not limited to such a mode.

For example, in step (1), the work material 101 may be brought close to the cutting tool 1. In the same manner, in step (3), the work material 101 may be moved away from the cutting tool 1. When the machining is to be continued, steps of bringing the cutting edge 29 of the insert into contact with different positions on the work material 101 may be repeated while maintaining the rotating state of the cutting tool 1.

Here, representative examples of the material of the work material 101 include aluminum, carbon steel, alloy steel, stainless steel, cast iron, non-ferrous metals, or the like.

REFERENCE SIGNS LIST

1 Cutting tool
3 Holder
5 Insert
7 Main body portion
7a Opening
9 Fixing member
9a Screw hole
11 Placement portion
13 Pocket
15 Screw
17 Upper surface
19 Lower surface
21 First side surface (rear side surface)
23 Second side surface (inner side surface)
25 Third side surface (outer side surface)
25a First region
25b Second region 27 Fourth side surface (front side surface)
29 Cutting edge
31 Outer periphery cutting edge
33 Front end cutting edge
35 Through-hole
37 First surface
39 Second surface
41 Third surface
43 Projecting portion
101 Work material

What is claimed is:

1. A cutting tool comprising:
a holder that is a columnar body extending along a rotational axis from a first end to a second end, and comprises a pocket on a first end side thereof; and
an insert disposed in the pocket, and comprising a cutting edge on at least a part of a ridge line of neighboring surfaces; wherein
the pocket comprises:
a first surface in contact with the insert;
a second surface:
disposed further forward in a rotational direction of the rotational axis than the first surface; and
disposed on a radial inner side of the holder; and
a projecting portion that:
is positioned closer to a radial outer circumferential side of the holder than the first surface; and
projects forward in the rotational direction of the rotational axis, and
the second surface is inclined and comes closer to an outer circumference of the holder as going forward in the rotational direction of the rotational axis in a front view of the first end.

2. The cutting tool according to claim 1, wherein the projecting portion has a width that decreases as going forward in the rotational direction of the rotational axis in the front view of the first end.

3. The cutting tool according to claim 1, wherein, given a virtual circle that passes through an end portion of the second surface, the end portion disposed backward in the rotational direction of the rotational axis, with an end portion of the projecting portion disposed forward in the rotational direction of the rotational axis serving as a center point in the front view of the first end, the second surface is disposed inside the virtual circle.

4. The cutting tool according claim 1, wherein a surface of the projecting portion facing the insert is separated from the insert.

5. The cutting tool according to claim 1, wherein a region of the insert from a portion in contact with the second surface to the cutting edge in a reverse rotational direction of the rotational axis is exposed.

6. The cutting tool according to claim 1, wherein the insert further comprises a through-hole, and is fixed to the holder by a screw inserted in the through-hole.

7. The cutting tool according to claim 6, wherein a center of the screw is disposed between the second surface and the projecting portion, in the front view of the first end.

8. A method for manufacturing a machined product, the method comprising the steps of:
rotating the cutting tool according to claim 1;
bringing the cutting tool that is rotating into contact with a work material; and
separating the cutting tool from the work material.

9. A cutting tool comprising:
a holder having a columnar body extending from a first end to a second end along a rotational axis of the holder, the holder comprising a plurality of pockets on a first end side of the holder at the first end; and
a plurality of inserts disposed in respective pockets of the plurality of pockets, a respective insert of the plurality of inserts comprising a cutting edge on at least part of a ridge line of neighboring surfaces of the insert;
wherein a respective pocket of the plurality of pockets comprises:
a first surface in contact with the insert;
a second surface:
extending further forward than the first surface in a rotational direction of the rotational axis and
disposed closer to a radial inner side of the holder than the first surface; and
a projecting portion:
extending further forward than the first surface in the rotational direction and
disposed closer to a radial outer side of the holder than the first surface; and
the second surface is inclined toward the radial outer side when travelling along the second surface forward in the rotational direction.

10. The cutting tool according to claim 9, wherein the projecting portion is narrower farther away from the first surface than nearer to the first surface.

11. The cutting tool according claim 9, wherein the projecting portion comprises a first region facing the insert, and
the first region is separated from the insert.

12. A cutting tool comprising:
a holder having a columnar body extending from a first end of the holder to a second end of the holder along a rotational axis of the holder, the holder comprising a pocket along a perimeter of the first end; and
an insert disposed in the pocket, the insert comprising a cutting edge on at least part of a ridge line of neighboring surfaces of the insert,
wherein the pocket comprises:
a first surface in contact with the insert;
a second surface comprising:
a proximate end to the first surface and
a distal end to the first surface, wherein
the proximate end is positioned closer to a radial inner side of the holder than the first surface,
the second surface is inclined from the proximate end to the distal end with the distal end closer to a radial outer side of the holder than the proximate end, and
the second surface is positioned further forward in a rotational direction along the perimeter than the first surface; and
a projection portion:
positioned closer to the radial outer side than the first surface and
positioned further forward in the rotational direction along the perimeter than the first surface.

13. The cutting tool according to claim 12, wherein the projecting portion comprises:
a projecting end extending away from the first surface and
a base end nearer to the first surface than the projecting end,
wherein a width of the base end is greater than a width of the projecting end.

14. The cutting tool according claim 12, wherein
the projecting portion comprises a first region facing the insert, and
the first region is separated from the insert.

15. The cutting tool according to claim 12, wherein
the proximate end and the distal end of the second surface are positioned closer to the radial outer side than an innermost portion of the insert relative to the radial inner side.

16. The cutting tool according to claim 12, wherein
the pocket further comprises:
   a third surface interconnecting the projecting portion and the first surface, the third surface formed as a recess with a gap between the third surface and the insert.

17. The cutting tool according to claim 16, wherein
a fourth surface interconnecting the first surface and the second surface, the fourth surface formed as a recess with a gap between the fourth surface and the insert.

18. The cutting tool according to claim 12, wherein the projection portion hookably engages the insert.

\* \* \* \* \*